Dec. 7, 1937.　　　T. B. BOWEN　　　2,101,773

WINDSHIELD WIPER

Filed Feb. 1, 1937　　　2 Sheets-Sheet 1

Thomas B. Bowen,
INVENTOR

BY Victor J. Evans & Co.
ATTORNEYS

WITNESS

Dec. 7, 1937.  T. B. BOWEN  2,101,773
WINDSHIELD WIPER
Filed Feb. 1, 1937  2 Sheets—Sheet 2
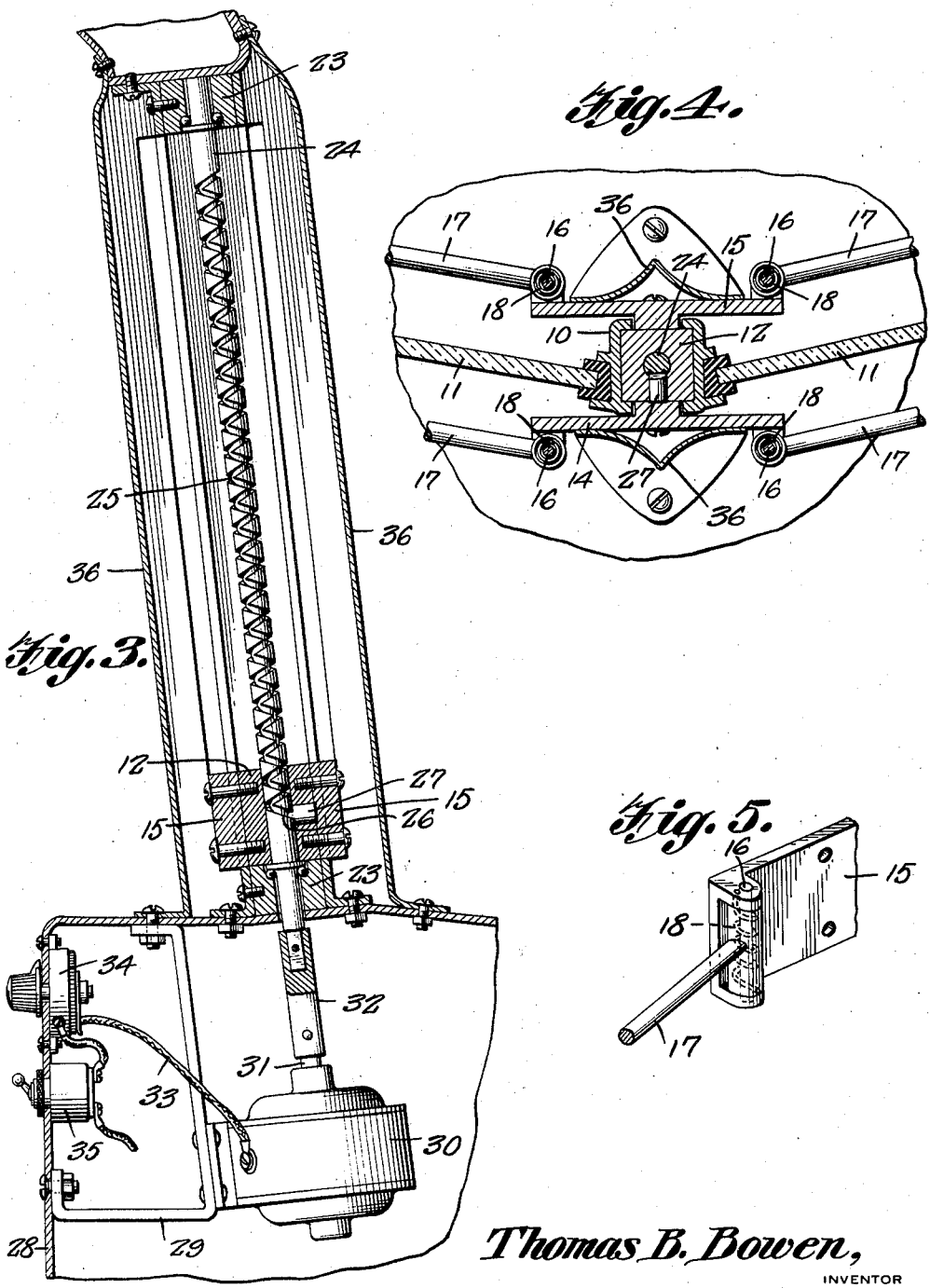
Thomas B. Bowen,
INVENTOR Patented Dec. 7, 1937

2,101,773

UNITED STATES PATENT OFFICE 2,101,773

WINDSHIELD WIPER

Thomas Benton Bowen, Huntington, W. Va.

Application February 1, 1937, Serial No. 123,464

4 Claims. (Cl. 15—252)

The invention relates to windshield wipers and more especially automatic wide spread windshield wipers for motor vehicles or the like.

The primary object of the invention is the provision of a wiper of this character, wherein through the use of a traveling carriage and a reversing feed screw the wiper arms will be reciprocated and the extent of these arms being such as to enable the cleaning of the windshield glass for the major extend thereof so that clear vision may be had therethrough during inclement weather.

Another object of the invention is the provision of a wiper of this character, wherein the construction thereof is novel in form and is permanently fitted within the windshield frame so as to afford a self-contained built-in unit and enables under automatic action the wiping of the windshield glass with a wide or maximum area of sweep of the wiper arms, these also being mounted in a novel manner.

A further object of the invention is the provision of a wiper of this character, which is comparatively simple in its construction, thoroughly effective and operative, assuring a wide wiping stroke for the cleaning of a windshield glass, strong, durable, and comparatively inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is a vertical transverse sectional view through the wiper and adjuncts.

Figure 4 is a fragmentary horizontal sectional view therethrough.

Figure 5 is a fragmentary perspective view of the hinge construction of one of the wiper arms.

Similar reference characters indicate corresponding parts throughout the several views in the drawings.

Figure 1:
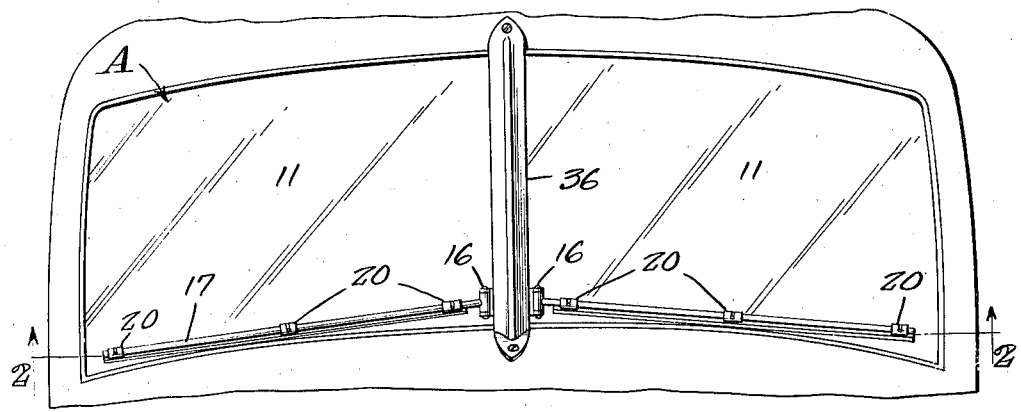
Figure 1 is a fragmentary front elevation of a motor vehicle equipped with a windshield showing the wiper constructed in accordance with the invention applied.
Figure 2:
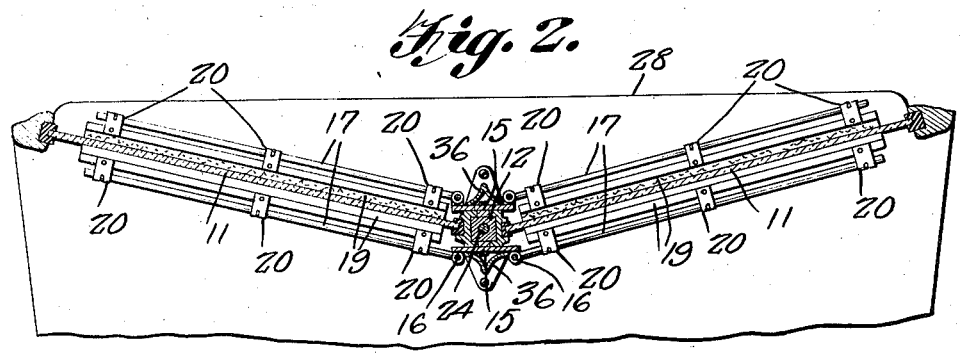
Figure 2 is a sectional view on the line 2—2 of Figure 1 looking in the direction of the arrows.
Figure 6:
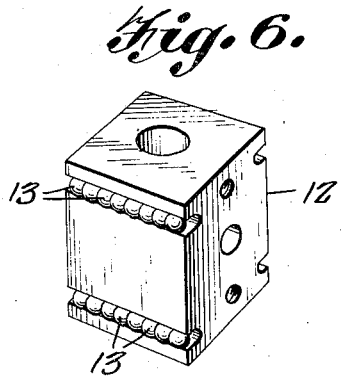
Figure 6 is a perspective view of the movable carriage of the wiper.
Figure 7:
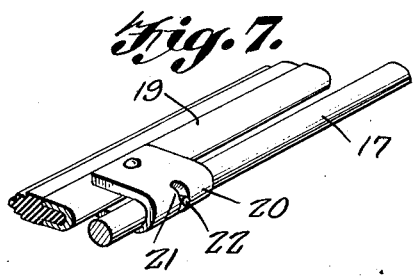
Figure 7 is a fragmentary perspective view of one of the wiper blades.

Referring to the drawings in detail, A designates generally a windshield glass constructed at the vertical center thereof with a hollow post 10, the sections 11 of the glass A being fitted with this post in any desirable manner. Movably fitted within the post 10 is a carriage in the form of a block 12 having fitted in opposite faces antifriction means such as bearing balls 13, these adapted to travel on the inner faces adjacent thereto of the said post 10.

Suitably secured to the carriage constituted by the block 12 to be disposed both outside and inside of the windshield A are the outer and inner supporting plates 14 and 15, respectively, these through pintle hinges 16 carry rod-like or wiper arms 17 which extend laterally to opposite sides of the said windshield A both outside and inside thereof. Each hinge 16 is fitted with a spring 18 which urges the wiper arm 17 toward the windshield.

On each wiper arm 17 is a wiper blade 19 which is adapted for swinging movement, being strapped at 20 to the arm 17. This strap is provided with an elongated slot 21 accommodating a stop pin 22 which limits the swing of the said blade 19 when the windshield wiper is in operation.

Fitted within the post 10 are top and bottom bearings 23 in which is centrally journaled a rotatable shaft 24 provided with double screw threads 25 which are connected at their ends 26 to make a continuous double thread. This shaft is loose in the block 12 which is provided with a releasable lug 27 adapted for fitting in the thread 25 so that on rotation of the shaft 24 the said carriage will be reciprocated in the post 10 to travel back and forth therein. The lug 27 is held in the block 12 by the plate 14.

Suitably fitted to the dash or instrument board, a portion being indicated at 28, is a bracket 29 supporting an electric motor 30, its driving shaft 31 being detachably coupled at 32 to the shaft 24 for operating the same and included in the electric circuit 33 for this motor is a hand regulated rheostat 34 and a hand actuated opening and closing switch 35 for the circuit, these being suitably mounted for access on the dash or instrument board 28 and are under the control of an operator. The rheostat regulates the speed of rotation of the motor 30.

Both forwardly and rearwardly of the post 10 are shield pieces 36 to afford neatness in the self-contained or built-in windshield wiper. The starting and stopping of the motor 30 is had by the switch 35 while the speed of travel or rotation of the motor is regulated by the rheostat 34 in the operation of the windshield.

It is, of course, understood and contemplated within the scope of the invention that the windshield wiper may be operated or driven other than by an electric motor and this may be effected in any desirable manner. Furthermore, other changes, variations and modifications may be made in the invention as fall properly within the scope of the appended claims without departing from the spirit of the invention or sacrificing any of its advantages.

What is claimed is:

1. A wiper for a windshield having a central upwardly directed post and glass panels at opposite sides thereof, comprising a movable carriage built into the post for up and down motion with respect to said panels, a shaft journaled within said post and having connection with the carriage for imparting up and down motion thereto, and reversely extended laterally directed wiper arms fitted with the carriage for contact with the windshield.

2. A wiper for a windshield having a central upwardly directed post and glass panels at opposite sides thereof, comprising a movable carriage built into the post for up and down motion with respect to said panels, a shaft journaled within said post and having connection with the carriage for imparting up and down motion thereto, and reversely extended laterally directed wiper arms fitted with the carriage for contact with the windshield and engaging both the inside and outside faces of the panels thereof.

3. A wiper for a windshield having a central upwardly directed post and glass panels at opposite sides thereof, comprising a block movably fitting the post, a shaft journaled in said post and having connection with the block for imparting motion thereto, and a laterally directed wiper arm fitted with the block for contact with one of the glass panels.

4. A wiper for a windshield having a central post and glass panels at opposite sides thereof, comprising a block movably fitting the post, a shaft journaled within said post and having connection with the block for imparting motion thereto, and laterally directed wiper arms fitted with the block for contact with the glass panels at opposite sides of the post.

THOMAS BENTON BOWEN.